RECORDING AND REPRODUCING APPARATUS

Filed Aug. 3, 1946 2 Sheets-Sheet 1

INVENTORS
LOUIS J. BARBARA
MARVIN M. KLEIN
BY BERNARD HOWARD.
William F. Nickel
ATTORNEY INVENTORS
LOUIS J. BARBARA
MARVIN M. KLEIN
BERNARD HOWARD.
BY William F. Nickel
ATTORNEY Patented Oct. 17, 1950 2,525,995

UNITED STATES PATENT OFFICE 2,525,995

RECORDING AND REPRODUCING APPARATUS

Louis J. Barbara, Woodside, and Marvin M. Klein, Jackson Heights, N. Y., and Bernard Howard, North Arlington, N. J.

Application August 3, 1946, Serial No. 688,355

6 Claims. (Cl. 242—55)

Our invention is an improvement in recording and reproducing apparatus, in which a wire is magnetized by means of an electro-magnetic coil through which current is caused to fluctuate under the control of the human voice or other sounds; and which is subsequently caused to move in inductive relation to a coil to generate therein an electric current having corresponding fluctuations for the reproducing operation. The improvement relates more particularly to mechanism for controlling the means by which the wire is operated.

The wire employed for the purpose is usually of steel in sufficient length but of very small diameter. It is actuated by means of a pair of reels; being unwound from one and wound up on the other, the reels being rotated so as to pull the wire over guide pulleys between two of which the coil used to magnetize the wire for recording and to be in turn influenced by the wire for reproducing is mounted. The movement of the reels must be carefully regulated to prevent breaking of the wire, and for this purpose it is desirable to actuate the reels not at a fixed number of revolutions per minute, but to vary gradually the rate of angular speed thereof so that the peripheral speed of the wire on both reels is the same; and the tension thereof is prevented from rising too high. Otherwise the wire is apt to be ruptured and the recording and the reproducing have to be stopped till proper working conditions are reestablished.

The most important object of the invention is to provide means for rotating the reels in either direction, so arranged that the wire can be unwound from one reel and wound up on the other; and then unwound from the latter and rewound on the first whenever required, and to regulate the revolution of the reels so that the wire can be actuated in the manner above stated.

A further object of the invention is to provide means for rotating the reels which will act as above described, said means being arranged so that after the wire is unwound from one reel it can be rewound thereon much more rapidly. Reproduction is thus greatly facilitated.

Another object of the invention is to provide means for revolving the reels at the required speed from the same driving shaft by suitable connections which are automatically completed for each direction of rotation as soon as the shaft starts turning.

The nature and advantages of the invention are fully set forth in the ensuing description, taken in connection with the drawings; but in practice many alterations may be made in the construction illustrated herein without deviating from the principle underlying the invention.

Figure 1:
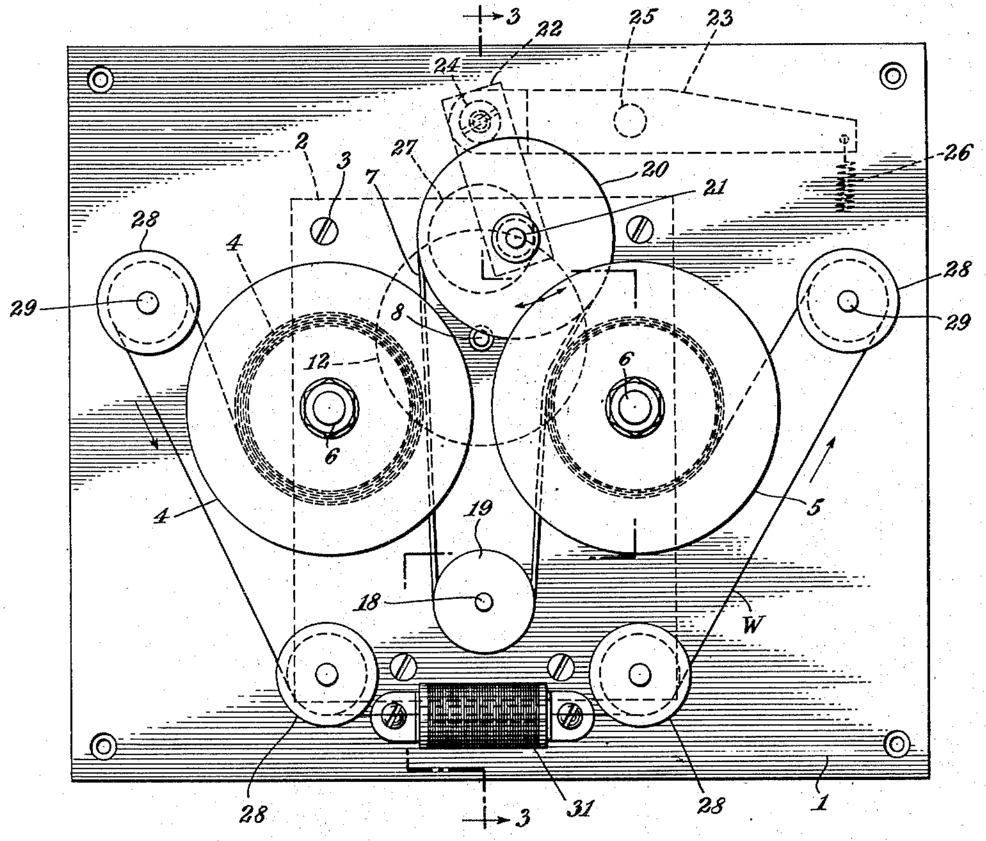
Figure 1 is a front view of a magnetic recording and reproducing apparatus containing mechanism according to this invention.

The apparatus comprises a front plate 1 and a back plate 2 connected by cross bars or bolts 3. These parts make up a supporting framework for the apparatus and on said framework is rotatably mounted a pair of reels 4 and 5 at the outer face of the plate 1. Suitable bearings in the plates 1 and 2 carry rotatable shafts 6 projecting through the plate 1 and to the forward ends of these shafts the reels are secured and keyed in any suitable way. The reels are turned by a belt 7 that engages the coils of wire W on the reels, and this belt always runs in contact with the layers of wire on both reels, so that the peripheral speed of the wire on one reel is always the same as on the other. This belt is driven by a shaft 8 connected to a motor with a reversing switch (not shown) so that the shaft can be revolved in either directions. This shaft has threads 9 and carries a disc of some weight to form an inertia member 10. This member has a central opening therein to receive the threads 9. At each side of the member 10 and affixed thereto in any approved manner, are clutch members 11, that cooperate with similar clutch members 12, opposing them face to face. The members 12 have rigid hubs 13, through which the shaft 8 passes, and these clutch members 12 are loosely mounted on the shaft 8. On the adjacent faces of each pair of members 11 and 12 are rings or layers 14 of rubber or some other frictional material.

Each of the hubs 13 of the clutch members 12 has a circumferential groove therein, and over each pulley so formed passes a belt 15. The belts 15 run to pulleys 16 and 17, of unequal size, on a shaft 18 in the framework under and parallel with the shaft 8. These pulleys 16 and 17 are rigid with the shaft 18 and lie between the plates 1 and 2. The shaft 18 projects through the front plate, and adjacent the latter it carries rigidly secured thereto the driving pulley 19 for the belt 7.

Shafts 8 and 18 are carried by the supporting framework in substantially central position, and the reels 4 and 5 are at each side of these two shafts. The wire strand shown at W passes from one reel to the other over several guide pulleys on the outer face of the front plate 1. Above the pulley 19 is another flanged pulley 20 for the belt 7, which is of rubber or some other substance having a frictional surface. The reels 4 and 5 are close enough together for the belt to pass between them and make contact with the layers of wire on both reels at once; and as one reel fills and the other is unwound, leaving a thinner layer of wire thereon, the belt can swing sideways away from the fuller reel to the extent required to maintain contact with substantially even pressure on both reels. To this end the pulley 20 revolves on a journal 21 attached to an arm 22 which is pivotally secured in the forked end of a lever 23 by a pin or screw 24; so that the upper pulley 20 can swing from side to side. The lever 23 is pivoted at 25 on the inner face of the plate 1; and is engaged at the other end by a sping 26, anchored to the inside face of the plate 1. A large hole 27 in the plate allows space for the play of the journal 21.

If the wire is wound on the reel 4, for example, when recording is to be accomplished, it passes first over a guide pulley 28 at the left of the reel 4, then down under a similar pulley below the reel 4, over to a guide pulley 28 under the reel 5, then to a guide pulley 28 above and to the right of reel 5 to the last-named reel. The pulleys 28 are all mounted on shafts 29. The bars or screw bolts 3 carry spacer sleeves 30. Between the two lower pulleys 28 is an electromagnetic coil 31.

With the reel 4 filled the belt 7 is set to engage with its outer surface against the wire thereon; and on the opposite side with its outer surface pressing at first against the core of the reel 5, which receives the wire. The circuit of the motor is then closed and the inertia member 10 is at once moved by threads 9 on the shaft 8 so that it will engage and turn the clutch member 12 which is connected to the pulley 16. With the motor rotating, this member 12 will revolve the pulley 16; and the pulley 19 will cause the belt 7 to make the reel 4 unwind and the reel 5 to wind up the wire thereon. As the layers of wire on the reel 5 increase, the lateral pressure of the thickening wire thereon against the belt pushes the pulley 20 more and more to the left to keep the belt in efficient contact with both reels. The peripheral speed of the wire on one reel is kept equal to the peripheral speed of the wire on the other; because this speed at both reels is fixed and determined by the movement of the belt 7 even though the speed of revolution of the two reels may vary. Hence, the tension of the wire W as it is drawn from one reel to the other is safely controlled.

During this motion the wire passes through or by the electric magnetic coil indicated at 31 and is magnetized to a different degree at every point in its length by pulsating current in this coil, the current being controlled by a microphone or the like modulated by the sounds which are to be recorded. The operation for recording and reproducing is the same as set forth in our companion application for patent on improvements in Magnetic Recorders and Reproducing Apparatus, Serial No. 688,354 filed of even date herewith.

When reproducing is desired, the wire is moved in the opposite direction to be rewound up on the reel 4 at the left. In this instance the arm 22 and pulley 20 are now farther over to the left, but the belt 7 makes contact with the layers of wire on the two reels as before. The motor is now operated in a reverse direction so that the member 10 moves the other or left-hand pair of clutch members 11 and 12 into engagement. Now the larger pulley 17 and the shaft 18 receive motion from the shaft 8, and the shaft 18 rotates the belt 7 in the reverse direction to draw the wire back on the reel 4 from which it was unwound in the first place.

Figure 2:
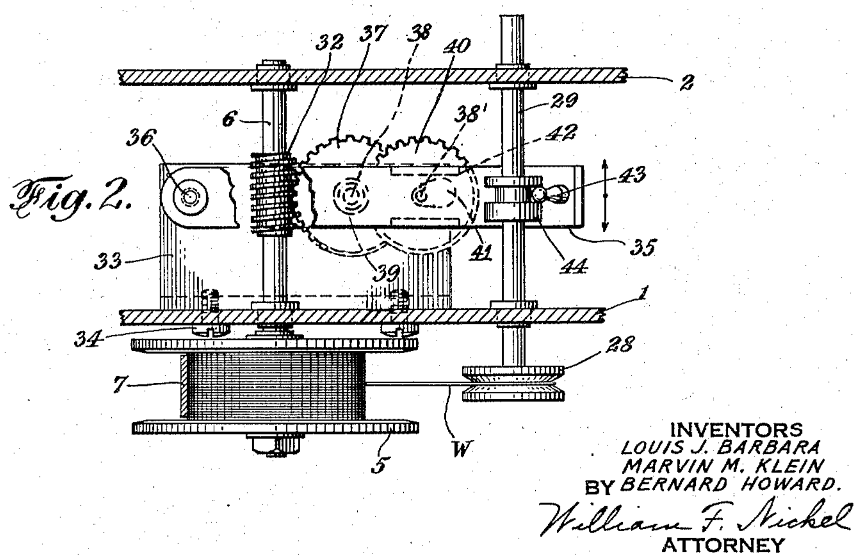
Figure 2 is a partial section thereof showing a form of spreader for the wire.
Figure 3:
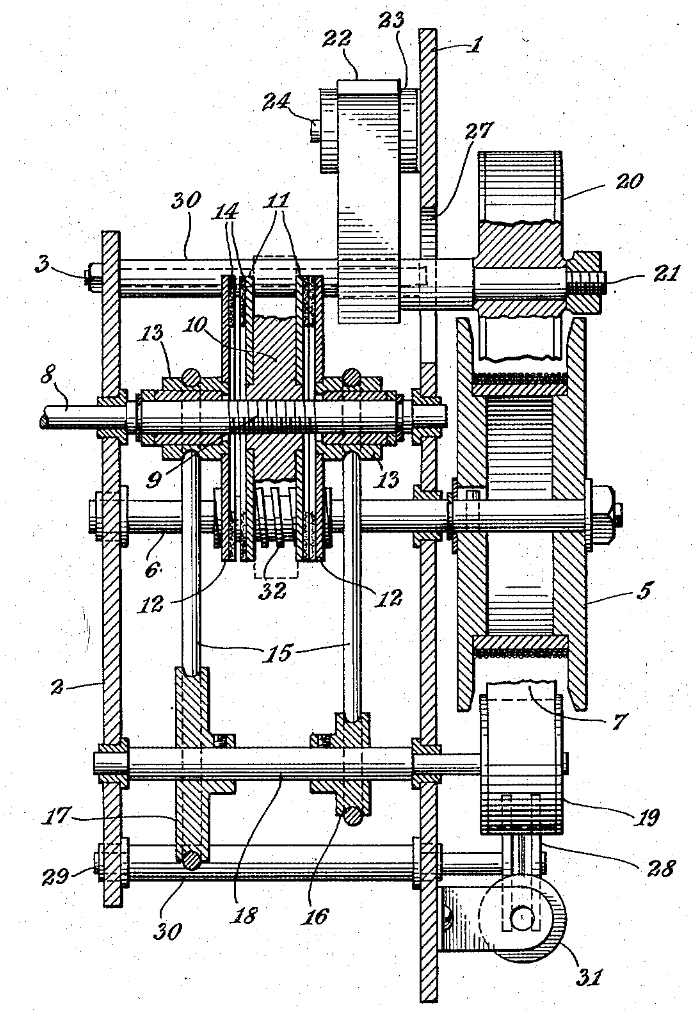
Figure 3 is a vertical section on the line 3—3 of Figure 1.

A spreader of conventional design can be included to wind the wire in smooth, even layers on the reels. For this purpose, the shaft 6 of the reel 5, for instance, is shown as having threads 32, and just below this shaft is a bracket 33, fastened to the inner face of the plate 1 by screws or the like 34. At the upper side of this bracket is an arm 35 mounted on a pivot post 36 at one end. On the top of the bracket is a gear 37, rotating on a journal 38 fixed to the bracket and meshing with the worm threads 32. This gear is integral on its upper face with a pinion 39 which rotates a second gear 40 just above and overlapping the gear 37. The latter has a shaft 38 in the bracket and is affixed to the shaft 38'; and this shaft carries on top of the gear 40 a cam 41. The swinging arm 35 runs from the pivot post 36 above the worm threads 32, (being broken away to show these threads) and over the gears 37 and 40 and the cam 41. The construction is illustrated in Figure 2, but the gears appear in dotted outline only for the sake of clearness. Adjacent the cam 41 the arm has downward extending ribs 42 at both side edges. The arm 35 has a stud 43 that engages a grooved collar 44 on the shaft 39 of the pulley 28 that is just a little higher and to the right of the reel 5. The shaft 29 of this pulley is reciprocable in its bearings supported by the plates 1 and 2, and as the mechanism is operated, the rotation of the shaft of the reel 5 causes the cam 41 between the ribs 42 to swing the arm 35 back and forth to keep the pulley 28 moving between the two flanges of the reel 5 to spread the wire turns evenly in each layer as required. The cam 41 and the inner faces of the ribs 42 are properly formed to operate as required. A single rib 42 can be employed with a spring stretched between the arm 35 and a convenient fixed point to keep the arm in contact with the cam as the latter rotates.

A similar spreader will be used in connection with the other reel and the other upper guide pulley 28 to move the latter so as to make the layers of wire smooth and even on the reel 4, when the wire is rewound thereon; but this second spreader is not included in the drawings, being omitted for the sake of convenience. The two spreaders are not part of this invention, but they operate together to facilitate the winding and unwinding of the two reels 4 and 5.

The wire W can be of metal, or of paper or some other material carrying particles of magnetic metal; and the mechanism described can be employed for devices other than magnetic recorders and reproducers but requiring the same mode of operation.

This construction is well adapted to serve the purpose, is simple and inexpensive to produce, and easy and certain in operation. All risk of putting too much tension on the wire and breaking the wire is eliminated.

Likewise a clutch differing from the inertia element 10 and members 11 and 12 in structure and operation could be utilized to impart motion in opposite directions to the shaft 18 when the motor is run to rotate in one direction or the other the drive shaft 8.

Having described our invention, what we claim is:

1. Mechanism for recording and reproducing apparatus comprising a pair of reels to carry a strand of wire to be transferred from one reel to the other, a belt making contact with the wire on both reels to impart motion thereto, means for driving said belt and means for permitting the belt to shift laterally; the means for driving said belt comprising a shaft having threads, an inertia member thereon engaged by said threads, clutch members and pulleys rigid therewith on said shaft to be alternatively engaged by said inertia member, a second shaft and pulleys affixed to the second shaft, each to be driven by one of said clutch members.

2. Mechanism for recording and reproducing apparatus comprising a supporting framework and having a pair of reels rotatably mounted thereon to carry a strand of wire to be transferred from one reel to the other, a belt making contact with the wire on both reels to impart motion thereto, a shiftable pulley for carrying said belt, and another pulley for driving said belt, a shaft in said framework to support the last named pulley, another shaft carried by said framework having a threaded portion with an inertia member thereon, a clutch member at each side of said member, a pulley carried by each clutch member, and means for connecting said pulleys alternatively to said shaft supporting the driving pulley.

3. Mechanism for recording and reproducing apparatus comprising a supporting framework, a pair of reels on the framework to carry a strand of wire to be moved from one reel to the other, a belt making contact with the wire on both reels to impart motion thereto, pulleys for said belt, one of said pulleys being shiftable to permit the belt to move laterally, a shaft for operating said belt, a pair of pulleys on said shaft, and driving means including members to connect either of the pulleys on said shaft to the driving means for operation of said shaft in either direction.

4. Mechanism for recording and reproducing apparatus comprising a supporting framework, a pair of reels on the framework to carry a strand of wire to be transferred from one to the other, a belt making contact with the wire on both reels, a pulley for operating the belt, a second pulley for the belt, means for shifting the second pulley to move the belt sidewise, a shaft on which the operating pulley is mounted, fixed pulleys on said shaft, another shaft parallel to the first shaft, a pair of pulleys loosely mounted on the other shaft, and connected to the pulleys on the first shaft, and means for rotating the other shaft in reverse direction.

5. Mechanism for recording and reproducing apparatus comprising a pair of reels to carry a strand of wire to be transferred from one to the other, a supporting framework, a power shaft mounted in said framework and having threads thereon, an inertia member on the shaft engaged with said threads, clutch members loosely mounted on said shaft to be engaged by said member and rotated in opposite directions, a second shaft in the framework, means for connecting said clutch members alternatively to the second shaft, and a belt operated by the second shaft, said belt engaging the wire on the reels to actuate the latter.

6. Mechanism for recording and reproducing apparatus comprising a pair of reels to carry a strand of wire to be transferred from one reel to the other, a belt making contact with the wire on both reels to impart motion thereto, means for driving said belt and means for permitting the belt to shift laterally; the means for driving said belt comprising a shaft, clutch members and pulleys rigid therewith on said shaft to be alternatively operated by said shaft, a second shaft and pulleys affixed to the second shaft, each to be driven by one of said clutch members.

LOUIS J. BARBARA.
MARVIN M. KLEIN.
BERNARD HOWARD.

REFERENCES CITED

The following references are of record in the file of this patent:

FOREIGN PATENTS

| Number | Country | Date |
|---|---|---|
| 270,050 | Great Britain | May 5, 1927 |
| 614,821 | France | Dec. 23, 1926 |
| 706,197 | France | June 19, 1931 |